(12) United States Patent
Kitamorn et al.

(10) Patent No.: US 7,930,594 B2
(45) Date of Patent: *Apr. 19, 2011

(54) APPARATUS TO PRESERVE TRACE DATA

(75) Inventors: Alongkorn Kitamorn, Austin, TX (US);
Ashwini Kulkarni, Austin, TX (US);
Gordon D. McIntosh, Austin, TX (US);
Gary Lee Ruzek, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 703 days.

This patent is subject to a terminal disclaimer.

(21) Appl. No.: 12/022,511

(22) Filed: Jan. 30, 2008

(65) Prior Publication Data

US 2008/0140985 A1 Jun. 12, 2008

Related U.S. Application Data

(63) Continuation of application No. 10/857,459, filed on May 28, 2004, now Pat. No. 7,343,521.

(51) Int. Cl.
*G06F 11/00* (2006.01)
(52) U.S. Cl. ............................................ 714/34; 714/40
(58) Field of Classification Search .................. 714/34, 714/40, 38, 39, 45
See application file for complete search history.

(56) References Cited

U.S. PATENT DOCUMENTS

| | | | |
|---|---|---|---|
| 4,837,767 A | 6/1989 | Hartwell et al. | |
| 5,168,554 A | 12/1992 | Luke | |
| 5,345,590 A | 9/1994 | Ault et al. | |
| 5,642,478 A | 6/1997 | Chen et al. | |
| 5,805,790 A | 9/1998 | Nota et al. | |
| 5,918,047 A | 6/1999 | Leavitt et al. | |
| 6,473,830 B2 | 10/2002 | Li et al. | |
| 6,493,837 B1 | 12/2002 | Pang et al. | |
| 6,658,591 B1 | 12/2003 | Arndt | |
| 6,681,309 B2 | 1/2004 | Szendy et al. | |
| 6,836,855 B2 | 12/2004 | Arndt | |
| 6,851,074 B2 | 2/2005 | Miloiicic et al. | |
| 6,883,116 B2 | 4/2005 | Lee et al. | |
| 6,886,064 B2 | 4/2005 | Dawkins et al. | |
| 6,910,160 B2 | 6/2005 | Bajoria et al. | |
| 7,370,240 B2 * | 5/2008 | Dawkins et al. | 714/45 |
| 7,496,729 B2 * | 2/2009 | McIntosh et al. | 711/173 |
| 2002/0120815 A1 | 8/2002 | Zahavi et al. | |
| 2002/0178404 A1 | 11/2002 | Austen et al. | |
| 2003/0037225 A1 | 2/2003 | Deng et al. | |
| 2003/0056155 A1 | 3/2003 | Austen et al. | |
| 2003/0159086 A1 | 8/2003 | Arndt | |
| 2003/0208670 A1 | 11/2003 | Dawkins et al. | |
| 2004/0078735 A1 | 4/2004 | Quach | |
| 2005/0060516 A1 | 3/2005 | Bottemiller et al. | |
| 2005/0257094 A1 | 11/2005 | Dawkins et al. | |
| 2005/0268158 A1 | 12/2005 | McIntosh et al. | |

* cited by examiner

*Primary Examiner* — Dieu-Minh Le
(74) *Attorney, Agent, or Firm* — Yee & Associates, P.C.; Matthew W. Baca (57) ABSTRACT

A method, apparatus, and computer instructions for processing trace data in a logical partitioned data processing system. A partition causing an exception is identified in response to detecting the exception. The partition is one within a set of partitions in the logical partitioned data processing system. The trace data for the identified partition is stored in an error log or other data structure for a machine check interrupt handler.

19 Claims, 5 Drawing Sheets

APPARATUS TO PRESERVE TRACE DATA

This application is a continuation of application Ser. No. 10/857,459, filed May 28, 2004, now U.S. Pat. No. 7,343,521 status allowed.

CROSS REFERENCE TO RELATED APPLICATIONS

The present invention is related to the following applications entitled "Method and Apparatus for Preserving Trace Data in a Logical Partitioned Data Processing System", U.S. Pat. No. 7,370,240, filed on Apr. 29, 2004, and "Method and Apparatus to Eliminate Interpartition Covert Storage Channel and Partition Analysis", U.S. Pat. No. 7,496,729, filed on May 13, 2004, assigned to the same assignee, and which are incorporated herein by reference.

BACKGROUND OF THE INVENTION

1. Technical Field

The present invention relates generally to an improved data processing system and in particular to a method and apparatus for processing data. Still more particularly, the present invention relates to a method, apparatus, and computer instructions for managing trace data in a logical partitioned data processing system.

2. Description of Related Art

Increasingly large symmetric multi-processor data processing systems, such as IBM eServer P690, available from International Business Machines Corporation, DHP9000 Superdome Enterprise Server, available from Hewlett-Packard Company, and the Sunfire 15K server, available from Sun Microsystems, Inc. are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocatable resources include one or more architecturally distinct processors with their interrupt management area, regions of system memory, and input/output (I/O) adapter bus slots. The partition's resources are represented by the platform's firmware to the operating system image.

Each distinct operation system or image of an operating system running within a platform is protected from each other such that software errors on one logical partition cannot affect the correct operations of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image.

Thus, each image of the operating system or each different operating system directly controls a distinct set of allocatable resources within the platform. With respect to hardware resources in a logical partitioned data processing system, these resources are disjointly shared among various partitions. These resources may include, for example, input/output (I/O) adapters, memory DIMMs, non-volatile random access memory (NVRAM), and hard disk drives. Each partition within an LPAR data processing system may be booted and shut down over and over without having to power-cycle the entire data processing system.

When a logical partitioned data processing system experiences a failure, data relating to processes and system states are needed to help identify and analyze the failure. In current logical partitioned data processing systems, some of the data needed to diagnose a failure is not available because of the current design of the systems. For example, the platform firmware includes a trace facility to allow for tracing of code paths in the firmware. An example of platform firmware used in logical partitioned data processing systems is a hypervisor, which is available from International Business Machines Corporation.

With the currently used trace facilities, trace information showing the code path taken in the platform firmware and critical data values are written into a trace buffer as each partition makes platform firmware calls. This trace information is particularly critical when an error is encountered by a partition and the error path is traced along with critical data values.

Currently all logical partitioned mode data processing system platforms support a hypervisor trace facility used to write hypervisor code execution trace point data into a trace buffer located in hypervisor space during hypervisor execution. This hypervisor trace data is critical for effective failure analysis in the field in the event of system failures.

This situation creates a problem with large configurations where processors are dedicated to multiple partitions in which these partitions write to the same buffer. These buffers are typically organized in a circular fashion. Thus, if a partition crash occurs, the trace data may be quickly overwritten by other partitions in the logical partitioned data processing system. As a result, critical data, required to help in the diagnosis of the problem, may be lost.

One solution is to create a larger buffer. Further, as the number of partitions increase, the size of this trace buffer is required to grow to accommodate additional partitions. The buffer structure must be preallocated with the largest configuration in mind because each logical partitioned data processing system is configured individually and dynamic configuration is allowed. As a result, wasted memory space is present for smaller configurations. Further, in systems in which system memory is a premium price, the wasted space increases the cost of the logical partitioned data processing system.

Therefore, it would be advantageous to have an improved method, apparatus, and computer instructions for preserving trace data.

SUMMARY OF THE INVENTION

The present invention provides a method, apparatus, and computer instructions for processing trace data in a logical partitioned data processing system. A partition causing an exception is identified in response to detecting the exception. The partition is one within a set of partitions in the logical partitioned data processing system. The trace data for the identified partition is stored in an error log or other data structure for a machine check interrupt handler.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
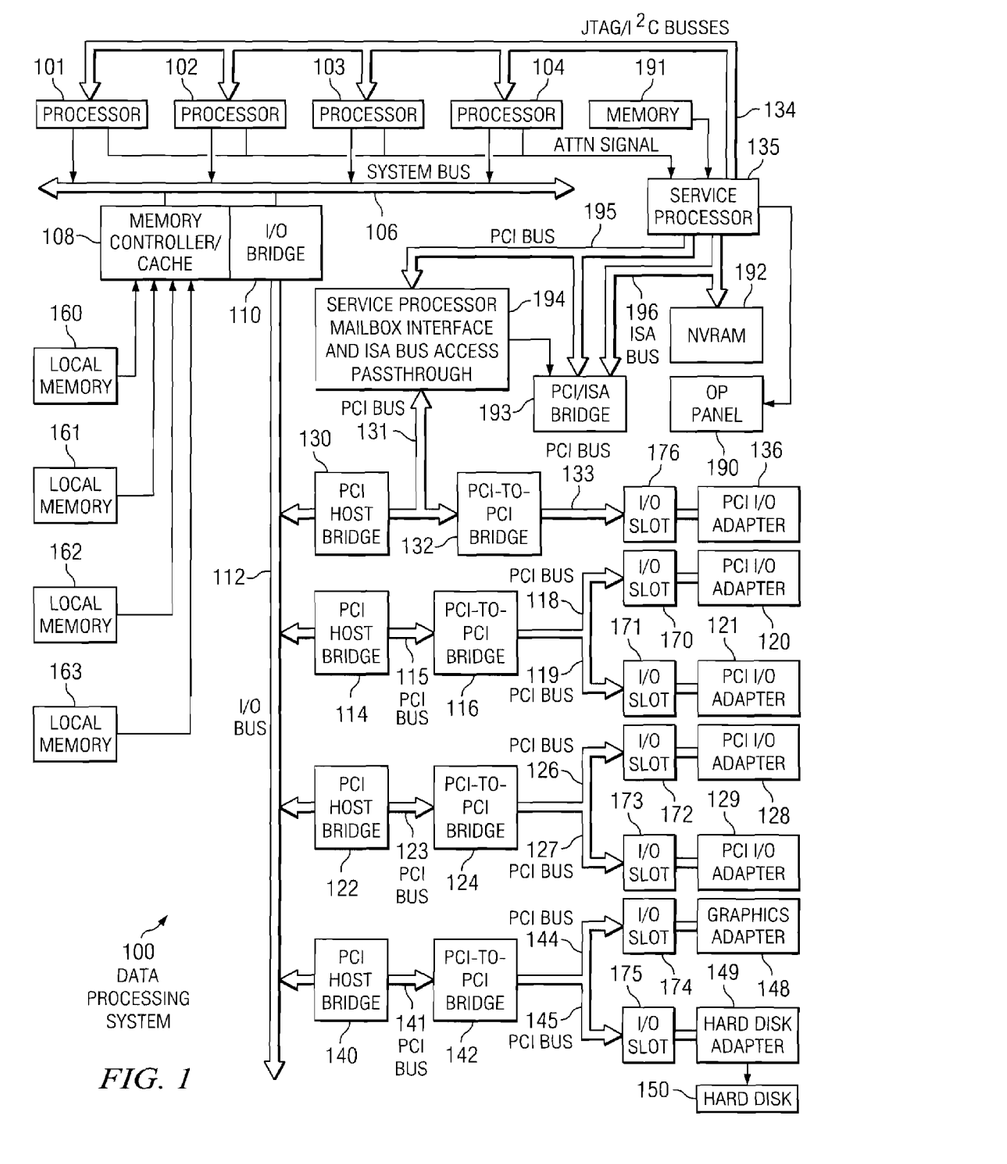
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions.

Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129.

PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor.

The service processor 135 has its own local memory 191, and has access to the hardware OP-panel 190.

When data processing system 100 is initially powered up, service processor 135 uses the JTAG/I²C busses 134 to interrogate the system (host) processors 101-104, memory controller/cache 108, and I/O bridge 110. At completion of this step, service processor 135 has an inventory and topology understanding of data processing system 100.

Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATS, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/o bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
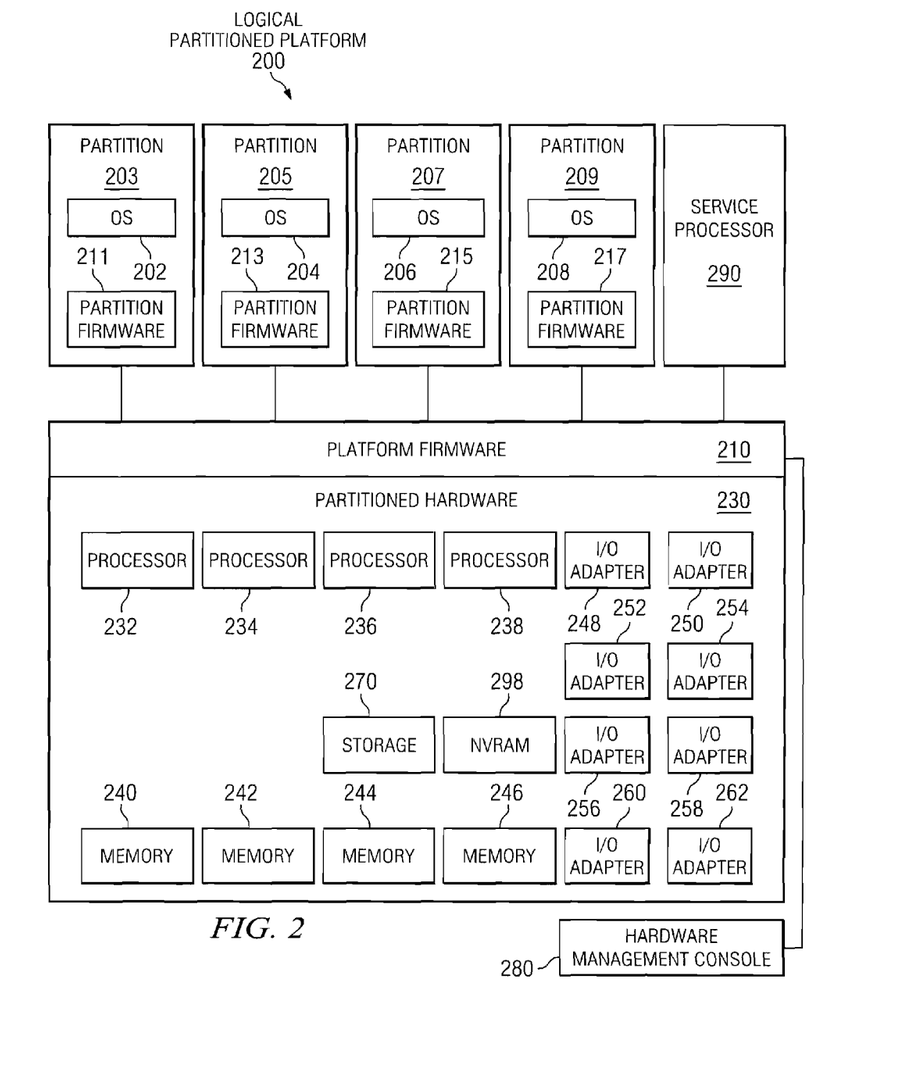
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Figure 3:
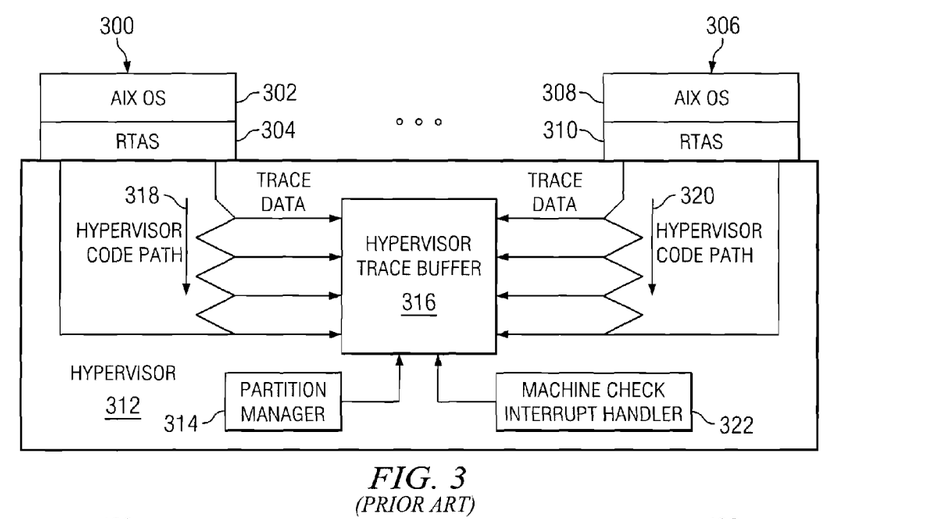
FIG. 3 is a diagram of components in a presently available logical partitioned data processing system used to process trace data.

With reference now to FIG. 3, a diagram of components in a presently available logical partitioned data processing system used to process trace data is shown. In this illustrative example, partition 300 contains operating system 302 and RTAS 304. Partition 306 contains operating system 308 and RTAS 310. In these depicted examples, up to 255 partitions may be present. All of these partitions are managed through platform firmware, such as hypervisor 312.

Hypervisor code path 318 is generated as partition 300 makes calls to hypervisor 312. Trace data generated from these calls are stored in hypervisor trace buffer 316. This trace data is stored in entries in hypervisor trace buffer 418 in FIG. 4. The trace data contains trace information showing the code path taken and critical data values in these examples. In addition to trace data, each entry includes a partition identifier to identify the partition that made the call that resulted in the trace data. Partition manager 314 also writes trace information into hypervisor trace buffer 316 as a code path occurs. This trace information is written as this partition manager 314 makes calls to hypervisor 312. Partition manager 314 is a component within hypervisor 312. This component is used to manage the partitions and includes functions, such as starting and terminating partitions. The calls made by partition manager 314 are stored within hypervisor trace buffer 316.

In a similar fashion, as calls are made by partition 306 to hypervisor 312, hypervisor code path 320 is formed with the trace data for these calls being stored in hypervisor trace buffer 316. In a similar fashion, hypervisor code path 320 is formed as calls are received by hypervisor 312 by partition 306. The trace data for this path also is stored in hypervisor trace buffer 316.

As each partition is activated, the operating system is loaded and starts executing. As an operating system, such as operating system 302, needs platform resources, the operating system makes RTAS calls to RTAS 304, which in turn make hypervisor calls to hypervisor 312. As a hypervisor call executes, special "trace points" are executed in which trace data is written into hypervisor trace buffer 316, with no segregation of partition data. In other words, all of the trace data for all calls by all of the partitions are placed into this buffer.

Not only is the hypervisor data executing hypervisor calls on behalf of the partitions being written into a single buffer, but partition manager 314, which is a hypervisor facility, is also writing its trace data to the same trace buffer. Additionally, machine check interrupt handler 322 uses the same trace facility and stores information in hypervisor trace buffer 316.

This current system, however, stores all of the information within hypervisor trace buffer 316. As a result, data may be overwritten in the currently present systems because of limited space in these types of buffers. The problem increases in large configurations when all processors are dedicated to multiple partitions, writing to the same buffer organized in a similar fashion. If a partition crash occurs, trace data in hypervisor code path 318 is quickly overwritten by other partitions causing a loss of critical data that may help in the diagnosis of the problem.

Figure 4:
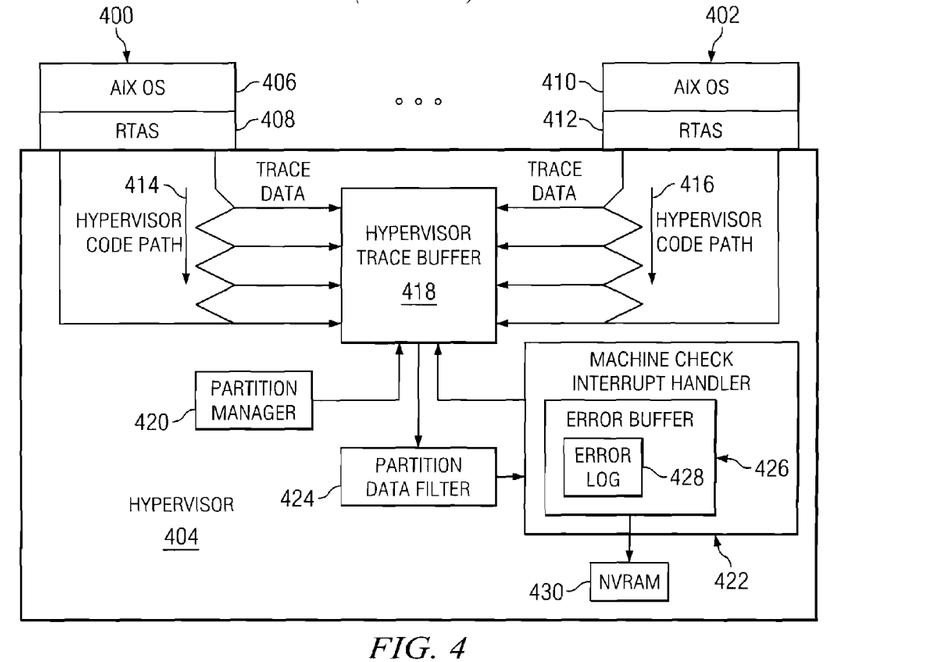
FIG. 4 is a diagram of a configuration for managing trace data to eliminate security vulnerabilities in accordance with a preferred embodiment of the present invention.

With reference now to FIG. 4, a diagram of a configuration for managing trace data to eliminate security vulnerabilities is depicted in accordance with a preferred embodiment of the present invention. In this illustrative example, partition 400 and partition 402 are present and managed through hypervisor 404. Partition 400 contains operating system 406 and RTAS 408, while partition 402 contains operating system 410 and RTAS 412. As partition 400 or partition 402 generates calls to hypervisor 404, hypervisor code path 414 and hypervisor code path 416 are generated with the trace data being stored in hypervisor trace buffer 418.

Further, partition manager 420 may generate calls in which trace data is stored in hypervisor trace buffer 418. Machine check interrupt handler 422 also stores data in hypervisor trace buffer 418.

Machine check interrupt handler 422 includes error buffer 426. Error log 428 is found in this buffer. This error log includes an error specific portion having a format that may be used by a selected or particular analysis program. This log also includes a user area that may be employed to store trace data in the illustrative examples.

In the illustrative examples, trace data in hypervisor trace buffer 418 is copied into error log 428 within error buffer 426 each time a machine check exception occurs. The copying is performed by machine check interrupt handler 422 in these illustrative examples. An exception is an error condition that changes the normal flow of control in a program. An exception may be generated or raised by hardware or software. Hardware exceptions include, for example, reset, interrupt or a signal from a memory management unit. Exceptions may be generated by the arithmetic logic unit or floating-point unit for numerical errors such as divide by zero, overflow or underflow or instruction decoding errors such as privileged, reserved, trap or undefined instructions.

A large percentage of partition crashes also create machine check exceptions. The mechanism of the present invention uses this type of event to obtain and store trace data in a manner that avoids loss of the trace data. In particular, the user portion of error log 428 is not used in these illustrative examples. This portion is used to store trace data. Any unused portion of the error log or other unused space within error buffer 426 may be used to store trace data from hypervisor trace buffer 418. Machine check interrupt handler 422 writes trace buffer data to the unused portion of error log 428 each time a machine check exception occurs. This feature allows the data be easily available to debug as the error logs are passed to all running partitions.

Only a small simple coding change to machine check interrupt handler 422 is required to include this additional feature. During a machine check initiated by an exception, the current pointer to the trace data is used to copy the last partition data causing the machine check from hypervisor trace buffer 418 into error log 428. The trace data may be filtered such that only trace data from the partition in which the exception occurred is copied into error log 428. This filtering may be implemented in partition data filter 424 within hypervisor 404 in these illustrative examples. Partition data filter 424 identifies the partition in which the exception occurred by examining the partition identifier found in the last trace entry in hypervisor trace buffer 418. This ID is used to filter trace data requested by machine check interrupt handler 422. Of course, this filter may be implemented elsewhere, such as within machine check interrupt handler 422.

If the partition has terminated, the partition data will still be present in hypervisor trace buffer 418 when the machine check interrupt handler 422 is invoked. Machine check interrupt handler 422 copies the trace data to error log 428 to preserve the trace data for debug purposes. Depending on the amount of space available in error log 428, not all of the trace data may be copied from hypervisor trace buffer 418 into error log 428. Machine check interrupt handler 422 copies data into error log 428 until all of the trace data has been copied or until no more space is available in error log 428.

After machine check interrupt handler 422 copies the partition trace data to error log 428, this log is written into non-volatile storage, such as NVRAM 430.

This log is copied by a special error collection routine. This routine then copies the log to all active partitions for analysis. In these examples, the routine is part of a machine check interrupt handler.

Figure 5:
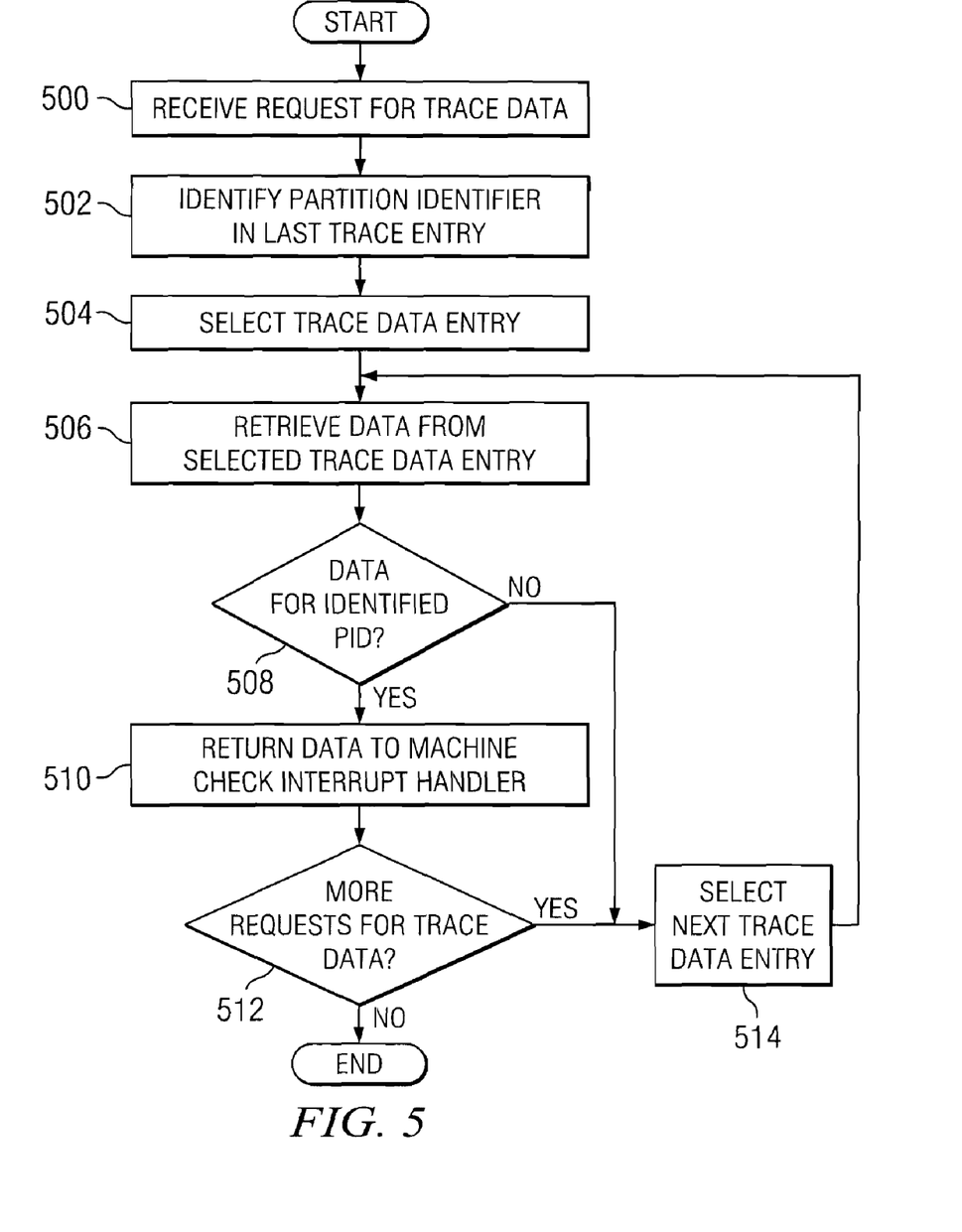
FIG. 5 is a flowchart of a process for filtering trace data in accordance with a preferred embodiment of the present invention.

With reference now to FIG. 5, a flowchart of a process for filtering trace data is depicted in accordance with a preferred embodiment of the present invention. The process illustrated in FIG. 5 may be implemented in a filter process, such as partition data filter 424 in FIG. 4. This process is initiated when a request is received for data from a trace buffer, such as hypervisor trace buffer 418 in FIG. 4. In these illustrative examples, the request is received from a machine check interrupt handler.

The process begins by receiving a request for trace data (step 500). Next, a partition identifier (PID) in the last trace data entry is identified (step 502). Then, the trace data entry is selected (step 504). The entry selected is one that has not been sent to the requester. Entries, in these illustrative examples, are selected from newest to oldest. In other words, the newest entries are selected first for transfer.

Next, data is retrieved for the selected trace data entry (step 506). Then, a determination is made as to whether data is for an identified PID (step 508). If the data is for the identified PID, then data is returned to the machine check interrupt handler (step 510). Next, a determination is made as to whether more requests are present for trace data (step 512). If more requests are not present for trace data, then the process terminates thereafter.

Referring back to step 508, if data is not available for the identified PID, then the next trace data entry is selected for processing (step 514) with the process then returning to step 506 as described above. In step 512, if more requests are made for trace data, then the process returns to step 514 as described above.

Figure 6:
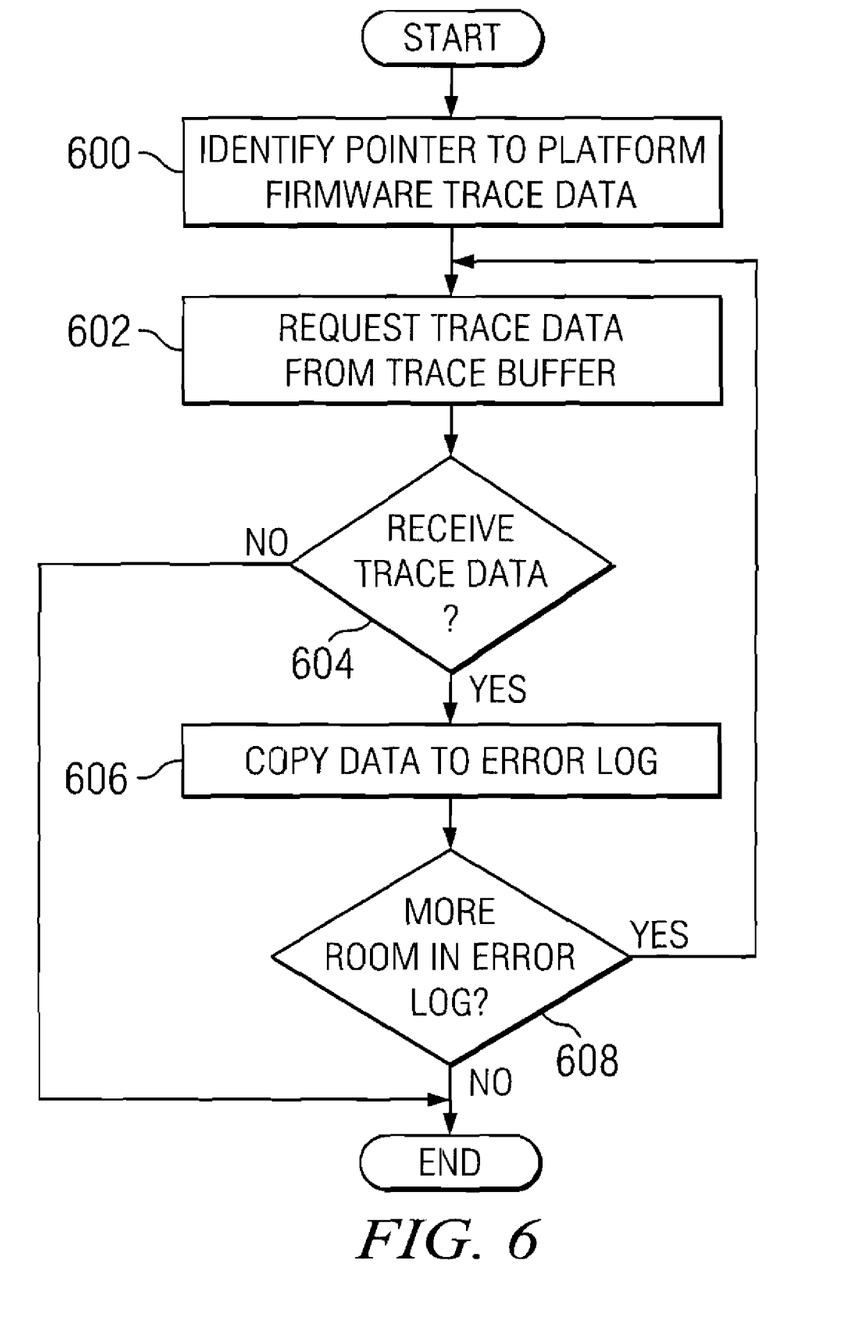
FIG. 6 is a flowchart of a process for saving trace data in an error log in accordance with a preferred embodiment of the present invention.

With reference now to FIG. 6, a flowchart of a process for saving trace data in an error log is depicted in accordance with a preferred embodiment of the present invention. The process illustrated in FIG. 6 may be implemented in a machine check interrupt handler, such as machine check interrupt handler 422 in FIG. 4. This process is initiated when an exception is present for the machine check interrupt handler to process.

The process begins by identifying pointer to platform firmware trace data (step 600). This pointer points to the current record in the trace data buffer. Next the trace data for a record in a trace data buffer is requested from the trace buffer (step 602). This pointer may be decremented to request different records in the trace buffer for examination. In response to the request, a determination is made as to whether trace data is received (step 604). In these examples, either trace data or an indication that no more data is present is returned in response to the request. Then, if trace data is received, this data is copied to an error log(step 606). Next, a determination is made as to whether more room is available in the error log (step 608). If more room is not available in the error log, then the process terminates.

Referring back to step 608, if more room is available in the error log, then the process returns to step 602 as described above. With reference again to step 604, if trace data is not received, the process terminates.

Thus, the present invention provides an improved method, apparatus, and computer instructions for processing trace data. The mechanism of the present invention preserves trace data by using existing error log space to store the trace data. In these examples, the error log is one associated with or created for use by a machine check interrupt handler. Data is retrieved each time an exception occurs that is to be handled by the machine check interrupt handler. This mechanism also filters the data retrieved such that only data from the partition causing the exception is returned.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the illustrative embodiment store trace data in an error log. This data may be stored in any data structure accessible by the process handling the exception. The embodiment was chosen and described in order to best explain the principles of the invention, the practical application, and to enable others of ordinary skill in the art to understand the invention for various embodiments with various modifications as are suited to the particular use contemplated.

What is claimed is:

1. A logical partitioned data processing system for processing trace data, the logical partitioned data processing system comprising:
one or more processors;
identifying means, responsive to detecting an exception, for identifying a partition, within a set of partitions in the logical partitioned data processing system, associated with the exception to form an identified partition; and
storing means for storing the trace data for the identified partition in an error log for a machine check interrupt handler, wherein the machine check interrupt handler includes the error log.

2. The data processing system of claim 1, wherein the storing means is a first storing means and further comprising:
second storing means for storing the error log in a non-volatile storage.

3. The data processing system of claim 2, wherein the non-volatile storage is a non-volatile random access memory.

4. The data processing system of claim 1, wherein the identifying means includes:
identifying means for identifying a partition identifier in a most recent trace data entry.

5. The data processing system of claim 1, wherein the identifying means and the storing means are located in a platform firmware.

6. The data processing system of claim 1, wherein the storing means is located in the machine check interrupt handler.

7. The data processing system of claim 1, wherein the identifying means is located in a partition data filter.

8. The data processing system of claim 1, wherein only the trace data for the identified partition are stored in the error log.

9. The data processing system of claim 1, wherein the trace data is initially located in a platform firmware trace buffer.

10. A computer program product in a recordable type storage medium having instructions stored thereon that are executable by a processor for processing trace data, the computer program product comprising:
first instructions, responsive to detecting an exception, for identifying a partition, within a set of partitions in a logical partitioned data processing system, associated with the exception to form an identified partition; and second instructions for storing the trace data for the identified partition in an error log for a machine check interrupt handler, wherein the machine check interrupt handler includes the error log.

11. The computer program product of claim 10 further comprising: third instructions for storing the error log in a non-volatile storage.

12. The computer program product of claim 11, wherein the non-volatile storage is a non-volatile random access memory.

13. The computer program product of claim 10, wherein the first instructions include:
sub-instructions for identifying a partition identifier in a most recent trace data entry.

14. The computer program product of claim 10, wherein the first instructions and the second instructions are located in a platform firmware.

15. The computer program product of claim 10, wherein the second instructions are located in the machine check interrupt handler.

16. The computer program product of claim 10, wherein the first instructions are performed by a partition data filter.

17. The computer program product of claim 10, wherein only the trace data for the identified partition are stored in the error log.

18. The computer program product of claim 10, wherein the trace data is initially located in a platform firmware trace buffer.

19. A logical partitioned data processing system comprising:
a bus system;
a memory connected to the bus system, wherein the memory includes a set of instructions; and
a processing unit connected to the bus system, wherein the processing unit executes the set of instructions to identify a partition, within a set of partitions in the logical partitioned data processing system, associated with an exception to form an identified partition, in response to detecting the exception; and store trace data for the identified partition in an error log for a machine check interrupt handler, wherein the machine check interrupt handler includes the error log.

* * * * *